United States Patent [19]
Rieth et al.

[11] Patent Number: 5,548,975
[45] Date of Patent: Aug. 27, 1996

[54] PROCESS AND INSTALLATION FOR THE SEPARATION OF A GASEOUS MIXTURE BY CRYOGENIC DISTILLATION

[75] Inventors: Norbert Rieth, Paris; Bernard Darredeau, Sartrouville; Jean-Yves Lehman, Maisons-Alfort, all of France

[73] Assignee: L'Air Liquide, Societe Anonyme Pour L'Etude et L'Exploitation des Procedes Georges Claude, Paris Cedex, France

[21] Appl. No.: 393,265

[22] Filed: Feb. 23, 1995

[51] Int. Cl.$^6$ .................................................. F25J 3/02
[52] U.S. Cl. .................................... 62/646; 62/656
[58] Field of Search ........................... 62/22, 37, 38

[56] References Cited

U.S. PATENT DOCUMENTS

| | | | |
|---|---|---|---|
| 5,076,823 | 12/1991 | Hansel et al. | 62/22 |
| 5,282,365 | 2/1994 | Victor et al. | 62/22 |

FOREIGN PATENT DOCUMENTS 4030749  4/1992  Germany.

OTHER PUBLICATIONS

D. J. Hersh et al., "Air Separation Plant Design", *Cryogenics*, Jul. 1977, London, pp. 383–390.

*Primary Examiner*—Ronald C. Capossela
*Attorney, Agent, or Firm*—Young & Thompson

[57] ABSTRACT

Process and installation for the production of variable flow rates of at least one pure component by fractionation of a mixture in a distillation apparatus (15), containing structured packing (17) and dimensioned to handle a nominal flow rate of the mixture at nominal pressure. To obtain higher production than the nominal production, there is increased proportionately to the ratio of the productions, the flow rate of the mixture distilled in the apparatus (15). Also increased is the operating pressure of the apparatus so as to increase the flooding limit of the apparatus under similar proportions. Preferably, the mixture is air. There is a compressor (3) for the mixture to be fractionated designed for nominal capacity and, upstream of the latter, a blower (1). Alternatively, there can be a compressor (3) for the mixture to be fractionated designed for maximum capacity. There is a heat exchange line (9) in which is effected an indirect heat exchange between the mixture to be fractionated which is cooled therein and at least one product of the apparatus (15) which is reheated therein, the heat exchange line being designed for operation at nominal production, and in which the ratio between the number of passages allotted to the mixture to be fractionated and the number of passages allotted to at least one product of the apparatus is variable according to the production regime that prevails.

14 Claims, 2 Drawing Sheets

NOMINAL PRODUCTION

MAXIMUM PRODUCTION

PROCESS AND INSTALLATION FOR THE SEPARATION OF A GASEOUS MIXTURE BY CRYOGENIC DISTILLATION

FIELD OF THE INVENTION

The present invention relates to an installation for the production of variable flow rates of at least one pure component by cryogenic distillation of a mixture. It concerns in the first instance an installation operating nominally and capable of passing from nominal operation to maximum operation with a production greatly increased from that obtained with nominal production.

BACKGROUND OF THE INVENTION

In a known air distillation installation of this type, the elements constituting the installation are all overdimensioned and can have reduced production regimes, which reduction can reach 40% of the maximum production. It is quite evident that an installation designed to operate at 100% of its capacity, and which functions only at 60% of this capacity, would not be economical.

In a plate column, without overdimensioning, only excess flow rates of 5 to 10% can be accepted. Beyond these values, the diameter of the column, as well as the spacing of the plates, must be overdimensioned to permit a margin greater than 10%.

SUMMARY OF THE INVENTION

The invention has for its object to provide an installation designed as much as possible to function under normal operation but being adapted to function however at a higher capacity than nominal, requiring but a minimum of technical adaptation.

To this end, the invention has for its object an installation for the production of variable flow rates of at least one pure component by fractionation of a mixture in a distillation apparatus containing essentially packing structure and dimensioned to treat a nominal flow rate of said mixture at nominal pressure, characterized in that it comprises, to obtain higher production than the nominal production, means to increase proportionately relative to said productions the flow rate of said mixture distilled in the apparatus as well as means to increase the operating pressure of the apparatus so as to increase the limit of flooding of the apparatus with similar proportions.

The packings can be of the cross-corrugation type.

The mixture distilled in the apparatus can be air.

So as to purify the mixture to be fractionated and more particularly when the latter is air, the installation comprises a preliminary system of purification of the mixture to be fractionated of the adsorption type dimensioned to purify the nominal flow rate capable of functioning with a reduced cycle time when the flow to be fractionated is greater than the nominal flow, the system being capable of being regenerated by a flow of gas produced by the apparatus that is reduced relative to the regeneration flow under nominal operation of the apparatus in a lower proportion relative to the flow rate to be fractionated and the nominal flow rate.

It also comprises a heat exchange line in which indirect heat exchange takes place between the mixture to be fractionated which is cooled therein and at least one product of the apparatus which is reheated therein, the heat exchange line being dimensioned for nominal production. The ratio between the number of passages allotted is preferably variable according to the established production regime.

Thus, when the production is greater than the nominal production, the number of passages allotted to at least one product of the apparatus is reduced relative to the number allotted under nominal production, and the passages thus rendered available are allotted either to the mixture to be fractionated, or to at least one other product of the apparatus.

For example, when the mixture to be fractionated is air, the number passages allotted to the residual nitrogen is reduced when the production is greater than the nominal production.

The invention also has for its object a process for modification of the production of an installation for the production of at least one pure component by fractionation of a mixture in a distillation apparatus containing essentially structured packing and dimensioned to treat a nominal flow rate of said mixture in which to pass from a nominal production to a higher production, i) the flow rate of the mixture to be fractionated is increased substantially in the ratio of said productions, and ii) at the same time the fractionation pressure of the apparatus is increased so as to increase the flooding limit of the apparatus.

The invention also has for its object a process for the modification of production of an installation for the production of at least one pure component by distillation comprising a heat exchanger having a plurality of passages allotted to fluids to be reheated and to be cooled, characterized in that the allotment of the passages is varied according to variations of production of the installation.

Preferably, when the production of the installation increases, the number of passages allotted to fluids to be cooled is increased, and consequently the number of passages allotted to fluids to be reheated is reduced.

In particular, the fluids to be cooled are fluids destined for distillation and the fluids to be reheated are the products of distillation.

Under maximum production, the number of passages allotted to the flow to be distilled is increased and the number of passages allotted to a residual gas of the distillation is reduced.

BRIEF DESCRIPTION OF THE DRAWINGS

Examples of operation of the invention will now be given, with respect to the accompanying drawings, in which:

FIG. 2 is a schematic view of a potion of the heat exchange line of FIG. 1.

DETAILED DESCRIPTION OF THE INVENTION

Figure 1:
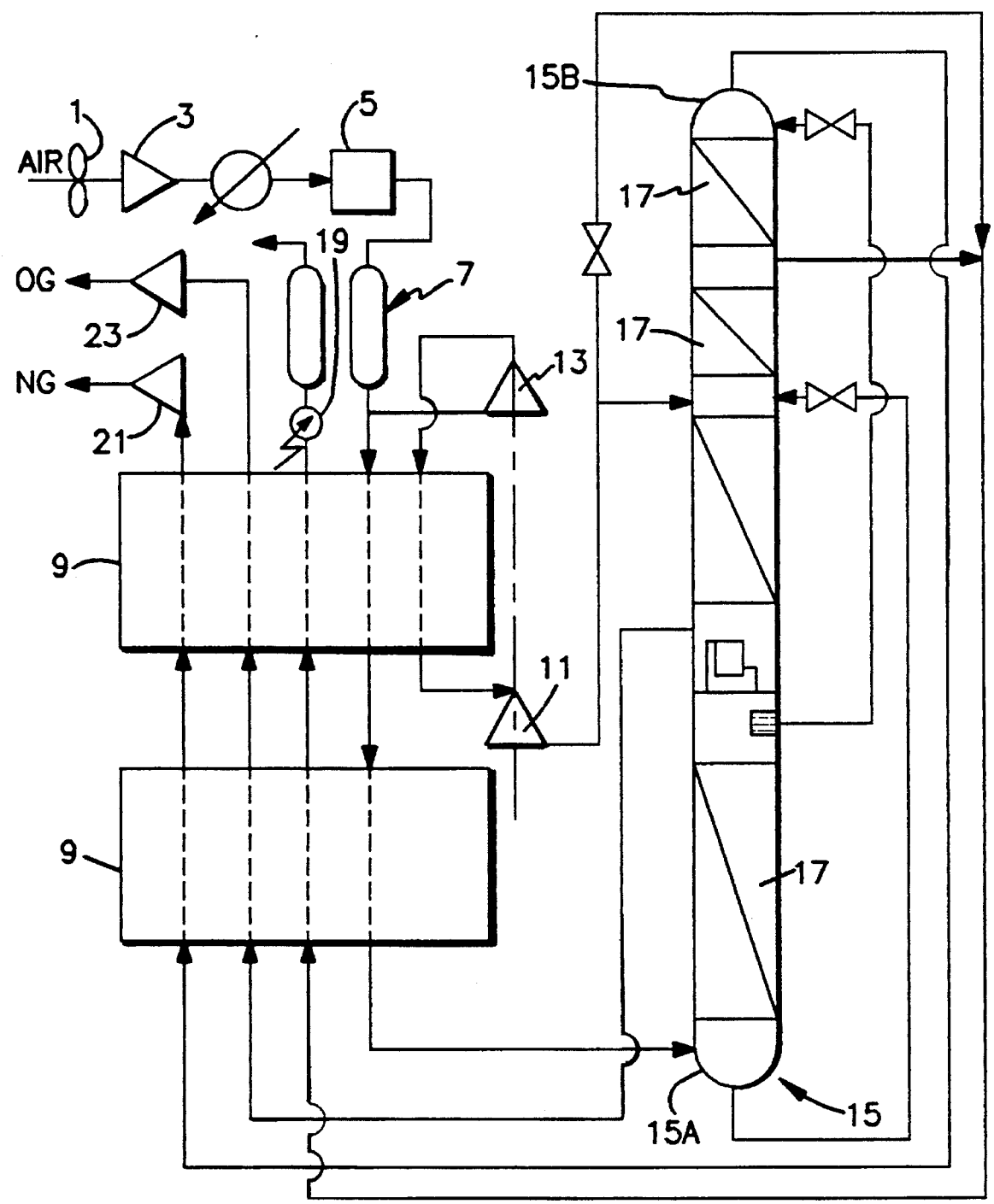
FIG. 1 is a schematic view of an embodiment of the installation according to the invention.

The installation of FIG. 1 comprises essentially a blower 1, a principal air compressor 3, a refrigeration group 5, an apparatus for purification by adsorption 7, a heat exchange line 9, a cold supply turbine 11 coupled to an air compressor 13, a distillation apparatus 15 constituted by a double column comprising itself a medium pressure column (MP), 15A surmounted a low pressure column (LP) 15B, the two columns containing packing structures 17, a regenerative reheater 19, a nitrogen compressor 21 and an oxygen compressor 23.

To describe the operation of this installation, it will be supposed at the outset that it is in nominal operation (480 tons per day) of oxygen. In this case the air blower 1 does not operate and the nominal air flow is compressed to $5 \times 10^5$ Pa by the compressor 3 alone, cooled to ambient temperature, purified in apparatus 7 and divided into two streams. One of these streams is sent directly to the heat exchange line 9 in which it is cooled to the vicinity of its dew point at $5 \times 10^5$ Pa, before being injected into the base of the medium pressure column 15A. The other stream is compressed by the compressor 13, partially cooled in the heat exchange line 9 and expanded in the turbine 11 and then sent to the low pressure column 15B.

Rich liquid from the base of the medium pressure column 15A is expanded to $10^5$ Pa and injected at an intermediate level of the low pressure column 15B and poor liquid from the head of the medium pressure column 15A is expanded to $10^5$ Pa and injected at the top of the low pressure column 15B.

A stream of impure nitrogen, withdrawn from the low pressure column 15B, is reheated in the heat exchange line 9 to be then sent to the purification apparatus 7 to regenerate it after reheating as the case may be in the reheater 19.

A stream of gaseous oxygen is withdrawn from the base of the low pressure column 15B and passes through the heat exchange line 9 to be there reheated with the stream of gaseous nitrogen withdrawn from the top of the low pressure column 15B. The nitrogen and oxygen are then compressed by the compressors 21 and 23, respectively.

To permit the installation to operate at 130% of its nominal production (620 tons per day) of oxygen, the blower 1 is operated, which is adapted to be of volume flow near that of the compressor 3 and to supply at its output a pressure of $1.3 \times 10^5$ Pa near the ratio of the productions. In this way, the compressor 3, so sized as to operate at its nominal capacity when its intake pressure equals the atmospheric pressure can, while continuing to treat a constant volume flow rate, also handle the increase of the mass flow rate. Thus, the maintenance of the intake flow rate of the compressor 3 is ensured and the pressure of the supplied air rises to $6.5 \times 10^5$ Pa.

The refrigeration group 5 is dimensioned for the maximum production (130% of the nominal production); however the air purification apparatus 7 is dimensioned for the nominal production. When the flow rate of supplied air increases to its maximum value, the flow rate of $CO_2$ contained in the air increases proportionally and therefore the cycle time for the apparatus is reduced about 11% so as to adsorb all the $CO_2$, while ensuring that the heated regeneration flow rate in the reheater 19 does not exceed the regeneration flow rate of nominal operation by more than 20%.

TABLE 1

|  | 480 Tons per Day (FIG. 1) | 620 Tons per Day (FIG. 1) |
| --- | --- | --- |
| Tank pressure ($10^5$Pa a) | 5.26 | 6.4 |
| Temperature of the air to be purified °C. | 10 | 10 |
| Air flow rate (Nm$^3$/h) | 68,660 | 89,196 |
| Water flow rate (kg/h) | 131 | 141 |
| $CO_2$ flow rate (kg/h) | 54 | 70 |
| Cycle time (min) | 180 | 160 |
| Regeneration flow rate (Nm$^3$/h) | 11,404 | 13,677 |

Thanks to the presence of the structured packings 17 in the columns 15, the volume flow rates are maintained by a pressure increase approximately proportional to the increase of capacity when maximum production is approached. The filtering phenomenon is not encountered under these conditions with structured packings, given that these packings are capable of supporting liquid loads 30 to 50% greater than nominal capacity. This is not true for perforated plates whose spacing and liquid descent cannot handle flow rates greater than those for which they are dimensioned.

TABLE 2

|  | Operation at 480 Tons per Day | Raised to 620 Tons per Day |
| --- | --- | --- |
| Head pressure MP ($10^5$Pa a) | 4.92 | 6.07 |
| Column pressure LP ($10^5$Pa a) | 1.35 | 1.72 |
| Gaseous flow rate at the bottom of LP column (Nm$^3$/h) | 36,372 | 47,192 |
| Gaseous flow rate at the head of MP column (Nm$^3$/h) | 69,339 | 91,974 |

Table 2 shows the maintenance almost identically of the volume flow rates in the columns, essentially due to the presence of the structured packings.

Columns 15 themselves obviously have the wall thickness capable of resisting the pressure increase involved in maximum production.

The compressors 21 and 23 are slightly overdimensioned relative to nominal and, at maximum production, can also deliver the required pressure.

As a modification, the blower 1 could be removed and the compressor 3 dimensioned for the extreme conditions of operation.

Under these conditions, the apparatus can change continuously from nominal production to maximum production by adjusting the variable blading at the inlet of the compressor.

Finally, it is known that for an apparatus which distills air in a double column, of the type of FIG. 1, the compression pressure of the air is a function of the outlet pressures of the products separated during distillation, of the loss of pressure of these products in the heat exchange line and during the regeneration of the purification of the residual nitrogen, of the temperature difference in the principal vaporizer, of the pressure losses in the columns, and of the pressure loss engendered by the air in the heat exchange line. In the low pressure column, there exists a critical production which determines, having regard for its imposed outlet pressure and the pressure drops in the heat exchange line and the low pressure column, the following pressures:

the minimum pressure at the base of the low pressure column, which is to say in the principal vaporizer, therefore the condensation pressure of nitrogen at the head of the medium pressure column (having regard for the pressure drops in the medium pressure column and of the air in the heat exchange line), the delivery pressure of the air compressor.

Under maximum production, it is necessary, to drive back sufficiently the flooding limit that the pressure of the columns increases more quickly than the pressure drops of the output products, such that for the product which is not commercial, such as impure nitrogen, its pressure drop could be increased such that its pressure will be just sufficient to regenerate the absorbents at atmospheric pressure. This increase is obtained by reducing the number of residual nitrogen passages in favor of the air passages, which causes its pressure drop to be reduced. At a fixed distillation pressure, the energy of the air compressor is reduced which has a lower outlet pressure.

However, it will be clear that other redistributions of the passages could be of interest according to the types of products required.

Thus, if under maximum reduction the number of passages allotted to residual nitrogen is reduced, the freed passages could be allotted to another product or to other distillation products which are reheated in the heat exchange line, instead of those allotted to the air, as described above. In this way, the outlet pressure of at least one other distillation product can be increased, given that the pressure drops are reduced.

It is particularly to be noted that this manner of redistributing the passages of the heat exchange line is applicable to installations other than air distillation installations.

Figure 2A:
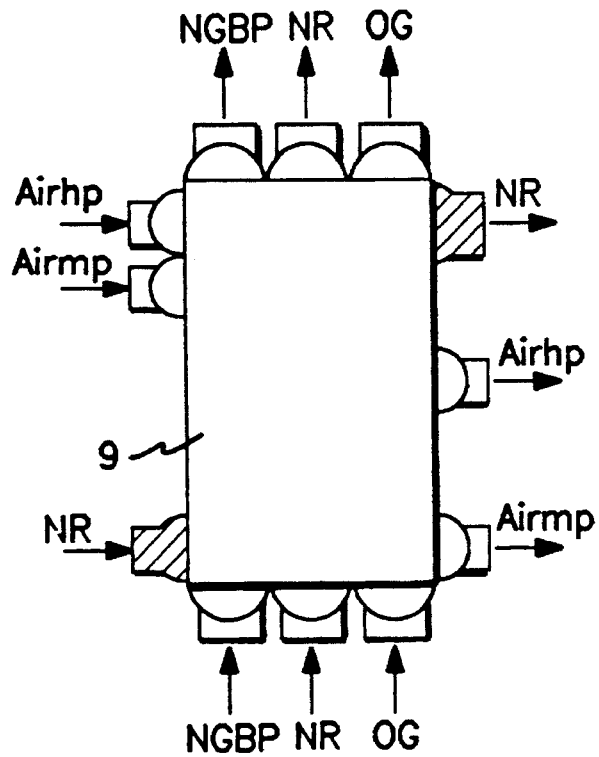
FIGS. 2A and 2B are schematic views of a portion of the heat exchange line of FIG. 1 during respectively nominal production and maximum production.
Figure 2B:
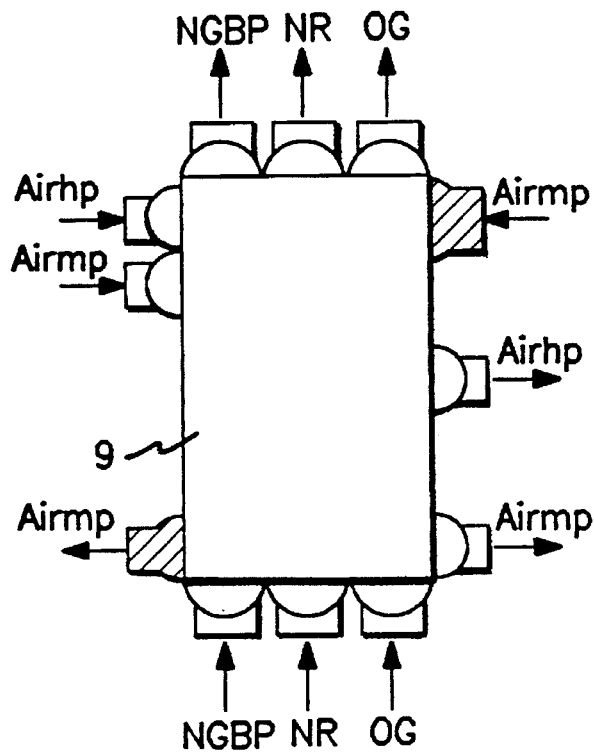

In accordance with FIG. 2, the change of operative condition is accompanied by the redistribution of the fluids in the heat exchange line 9 of the plate exchanger type. In the upper portion of the latter in FIG. 1, will be seen two fluid inlets and three outlets. Only one of the four bodies of exchanger 9 is illustrated. The supplied air is at two pressures (HP, MP), the air at high pressure (HP) coming from the compressor 13 and the medium pressure air (MP) coming directly from the purification 7. Under nominal conditions, the air is cooled in counter-current with the flow of oxygen from the low pressure column 15B, with the flow of nitrogen from the top of low pressure column 15B and with the flow of residual nitrogen that will regenerate the purification apparatus 7. These latter fluids are reheated.

Under nominal operation, the MP air is distributed over 48 passages per body of the exchanger 9 with a pressure drop of 200 mbar and the residual nitrogen is distributed over 30 passages with a pressure drop of 94 mbar (see Tables 3 and 4).

Under maximum operation, eleven of the passages traversed by residual nitrogen in nominal operation are traversed by the medium pressure air and the pressure drop of this air is reduced to 186 mbar while the pressure drop for residual nitrogen which does not exchange heat but over 19 passages rises to 259 mbar.

As in maximum operation, the supply air pressure increases as well as that of the exiting products, larger pressure losses are permissible in the tubes for residual nitrogen destined for the atmosphere and smaller pressure drops over the tubes for air which constitutes all the return pressure energy in the system.

TABLE 3

| | Heat exchange line 480 Tons per day | | | | |
| --- | --- | --- | --- | --- | --- |
| | MP Air | HP Air | LPGN | GO | RN |
| Q total Nm³/h | 63,100 | 3,500 | 25,000 | 14,013 | 27,587 |
| Q/body Nm³/h | 15,775 | 875 | 6,250 | 3,503 | 6,897 |
| Number of passages/bodies | 48 | 8 | 32 | 14 | 30 |
| Q per passage/body | 329 | 109 | 195 | 250 | 230 |
| Pressure 10⁵Pa | 5.156 | 7.069 | 1.257 | 1.354 | 1.255 |
| Pressure drop (mbar) | 200 | 21 | 70 | 117 | 94 |

TABLE 4

| | Heat exchange line raised to 620 Tons per day | | | | | |
| --- | --- | --- | --- | --- | --- | --- |
| | MP Air | MP Air | HP Air | LPGN | GO | RN |
| Q total Nm³/h | 67,591 | 15,489 | 3,500 | 33,000 | 18,200 | 35,380 |
| Q/body Nm³/h | 16,898 | 3,872 | 875 | 8,250 | 4,550 | 8,845 |
| Passages | 48 | 11 | 8 | 32 | 14 | 19 |
| Q per passage/body | 352 | 352 | 109 | 258 | 325 | 466 |
| Pressure 10⁵Pa | 6.291 | 6.291 | 9.076 | 1.615 | 1.718 | 1.614 |
| Pressure drop (mbar) | 186 | 186 | 16 | 90 | 147 | 259 |

We claim:

1. In an installation for production of variable flow rates of at least one pure component by fractionation of a mixture in a distillation apparatus containing structured packing and dimensioned to handle a nominal flow rate of said mixture at nominal pressure; the improvement which comprises, to obtain higher production than a nominal production, means operatively associated with the installation for increasing proportionately the flow rate of said mixture to be fractionated in the distillation apparatus to a ratio of said productions, and means for increasing the operating pressure of the distillation apparatus so as to increase a flooding limit of the distillation apparatus to similar proportions.

2. Installation according to claim 1, wherein the mixture is air.

3. Installation according to claim 1, further comprising a compressor for the mixture to be fractionated designed for nominal capacity and a blower positioned upstream of said compressor.

4. Installation according to claim 1, further comprising a compressor for the mixture to be fractionated designed for maximum capacity.

5. Installation according to claim 1, further comprising an adsorption purification system operatively associated with the installation for purifying the mixture to be fractionated, said system designed to purify a nominal flow and capable of functioning with a reduced cycle time when the flow rate to be fractionated is greater than the nominal flow, said system being capable of being regenerated by a flow of gas produced by the distillation apparatus, said flow being reduced relative to the regeneration flow under nominal conditions of the distillation apparatus, in a proportion lower than a ratio between the flow rate to be fractionated and the nominal flow rate.

6. Installation according to claim 1, further comprising a heat exchange line for effecting an indirect heat exchange between the mixture to be fractionated which is cooled therein and at least one product of the distillation apparatus which is reheated therein, said heat exchange line being designed for operation at nominal production, and in which a ratio between a total number of passages allotted to the mixture to be fractionated and a total number of passages allotted to at least one product of the distillation apparatus is variable according to a prevailing production regime.

7. Installation according to claim 6, wherein when production is higher than nominal production, the total number of passages allotted to at least one product of the apparatus is reduced relative to the number allotted thereto under nominal operation and the passages thus rendered available are allotted either to the mixture to be fractionated or to at least one other product of the distillation apparatus.

8. Installation according to claim 6, wherein the mixture to be fractionated is air, the distillation apparatus produces residual nitrogen, and the number of passages of the heat exchange line allotted to the residual nitrogen is reduced when production is greater than nominal production.

9. Installation according to claim 1, further comprising a heat exchange line for effecting indirect heat exchange between the mixture to be fractionated which is cooled therein and several products of the distillation apparatus which are reheated therein, said heat exchange line being designed for nominal production operation, and in which a ratio between a total number of passages allotted to one product of the distillation apparatus, and a total number of passages allotted to at least one other product of the distillation apparatus is variable according to a prevailing production regime.

10. Installation according to claim 9, wherein when production is higher than nominal production, the total number of passages allotted to at least one product of the distillation apparatus is reduced relative to the number allotted thereto under nominal operation, and the passages thus rendered available are allotted either to the mixture to be fractionated or to at least one other product of the distillation apparatus.

11. Installation according to claim 9, wherein the mixture to be fractionated is air, the distillation apparatus produces residual nitrogen, and the number of passages of the heat exchange line allotted to the residual nitrogen is reduced when production is greater than nominal production.

12. Process of modifying production of an installation for producing at least one pure component by fractionation of a mixture in a distillation apparatus containing structured packing and designed to handle a nominal flow rate of said mixture, which comprises: in order to pass from a nominal production to a higher production, i) substantially increasing the flow rate of the mixture to be fractionated according to a ratio of said productions, and ii) simultaneously increasing a fractionation pressure of the distillation apparatus so as to increase a flooding limit of the distillation apparatus.

13. Process according to claim 12, further comprising using a heat exchange line for effecting an indirect heat exchange between the mixture to be fractionated which is cooled therein and at least one product of the distillation apparatus which is reheated therein, said heat exchange line being designed for operation at nominal production, and wherein a ratio between the total number of passages allotted to the mixture to be fractionated and a total number of passages allotted to at least one product of the distillation apparatus is varied according to a prevailing production regime.

14. Process according to claim 12, further comprising using a heat exchange line for effecting an indirect heat exchange between the mixture to be fractionated which is cooled therein and at least one product of the distillation apparatus which is reheated therein, said heat exchange line being designed for operation at nominal production, and wherein a ratio between a total number of passages allotted to the mixture to be fractionated and a total number of passages allotted to at least one product of the distillation apparatus is varied according to a prevailing production regime.

* * * * *